June 9, 1964   J. H. McCOY ETAL   3,136,380
SONAR DOME AND SELF-DAMPING COMPONENT THEREOF
Filed Oct. 15, 1959
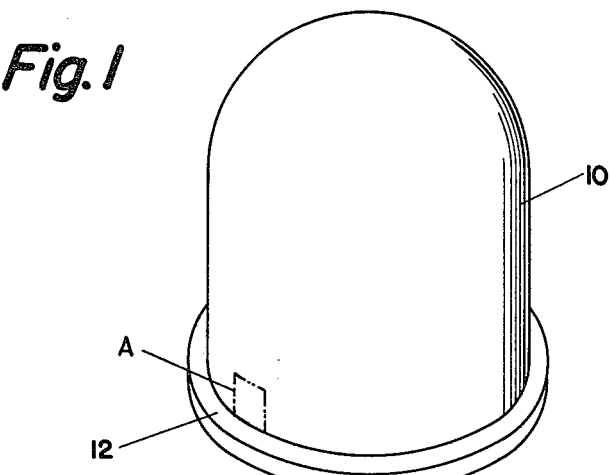
Fig. 1
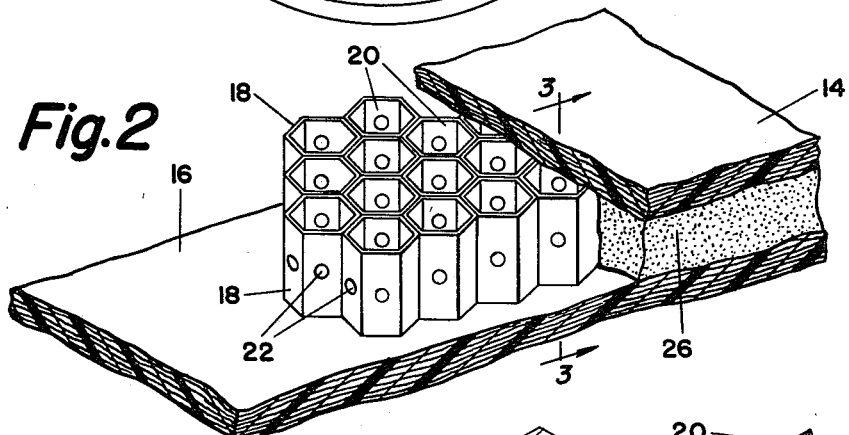
Fig. 2
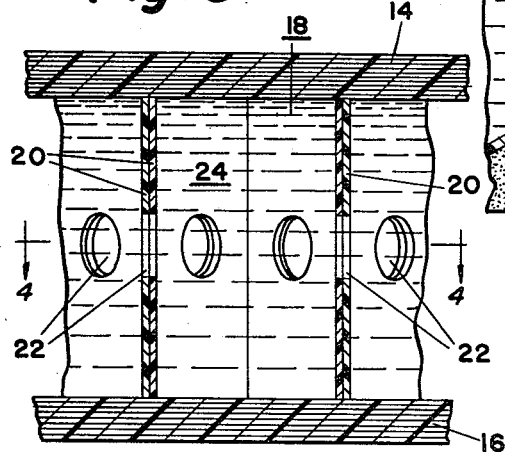
Fig. 3
Fig. 4
*INVENTORS*
JOHN HARVEY McCOY
BY WALTER H. GREENBERG
Arthur H. Seidel
ATTORNEY United States Patent Office 3,136,380
Patented June 9, 1964

3,136,380
SONAR DOME AND SELF-DAMPING COMPONENT THEREOF
John Harvey McCoy, Huntington, and Walter H. Greenberg, Syosset, N.Y., assignors to Riverside Plastics Corporation, Hicksville, N.Y., a corporation of New York
Filed Oct. 15, 1959, Ser. No. 846,662
5 Claims. (Cl. 181—.5)

The present invention is directed to a sonar dome and to a self-damping component thereof, and more particularly to a sonar dome having excellent acoustic impedance matching characteristics to water and excellent self-damping characteristics, and to a self-damping component thereof.

The requirements for sonar domes and windows have changed with the advent of higher speed vessels and more efficient sonar equipment. The higher underwater speeds have caused a self-noise problem which tends to limit sonar performance. Thus, locally generated noises drastically affect sonar performance, since detection of the signal over the background noise may be rendered exceedingly difficult.

This invention has as an object the provision of a sonar dome, and by sonar dome as used herein is meant sonar domes and/or windows in their broadest sense and in all sizes and of all types, which will effect rapid decay of induced shear waves.

This invention has as another object the provision of a sonar dome whose signal transmission capabilities to self-noise ratio is drastically improved over contemporary sonar domes.

This invention has as a still further object the provision of a sonar dome having an excellent acoustic impedance match to water.

This invention has as a still further object the provision of a sonar dome having good structural strength characteristics.

This invention has as a yet further object the provision of a self-damping material useful in sonar domes, and in other constructions, wherein the velocity and the resultant amplitude of shear wave forces with the construction is intended to be attenuated.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a diagrammatic perspective view of a sonar dome of the present invention.

FIGURE 2 is a perspective view, on an enlarged scale, partly in section, of a part of the housing wall such as in the region indicated in FIGURE 1 by the legend A.

FIGURE 3 is an enlarged sectional view taken on line 3—3 of FIGURE 2.

FIGURE 4 is a sectional view taken on line 4—4 of FIGURE 3.

Referring to the drawings, wherein like reference characters refer to like parts, the sonar dome 10 of the present invention may have any desired shape or form, applicable to sonar domes and windows. Thus, the present invention does not lie in a particular shape or form for the sonar dome, but in the sonar dome being formed of a particular material as will be more fully described below.

Thus, a sonar dome of the present invention, as shown in FIGURE 1, may be generally of suitable hydrodynamic shape and typically secured to the hull 12 of the vessel on which the sonar dome is mounted by appropriate means.

The sonar dome 10 of the present invention is formed, as seen in FIGURE 2, of three layers, namely skin layers 14 and 16 and honeycomb core 18.

The skin layers 14 and 16 are each relatively stiff, and preferably are acoustically identical in section. Each of the skin layers 14 and 16 is preferably formed from a reinforced plastic since reinforced plastics have relatively excellent acoustic impedance matching with water.

The reinforcement for the plastic may be a glass fiber, such as a glass fabric or a glass mat, or other suitable reinforcement material having similar reinforcement properties to glass in terms of strength and durability in the laminated plastic art, such as nylon.

The use of reinforced plastics of the aforesaid types enables excellent acoustic impedance matching to be obtained with water, namely between the water within the dome and the water outside of the dome.

The core 18 is preferably formed as a honeycomb core, although it is possible to use other interconnected cellular cores in the self-damping component material of the present invention.

The subject invention in its broadest aspect includes forming the core 18 and the skin layers 14 and 16 of metal.

The honeycomb core 18 is made up of a plurality of contiguous cells 20, each having a small opening 22 on each of its walls.

The skin layers 14 and 16 are joined, as by fusion or bonding or the like, to the faces of the honeycomb core 18, and the open ends of the honeycomb core cells 18 are sealed off. The honeycomb core 18 is filled with a viscous material 24, such as castor oil, glycerine, liquid polymers, gelatinous substances, etc. The viscous material 24 should occupy the entire interior of the honeycomb core 18, as seen in FIGURE 3, so that no air bubbles or voids are present.

The shell of self-damping component making up the sonar dome 10 is sealed along its outside edge 26 as shown in FIGURE 4. Thus, in order to contain the viscous material 24 the outside exposed cell walls of the honeycomb core 18 are sealed or framed by a protecting laminate.

The filled honeycomb core 18 differs acoustically from the relatively stiff skin layers 14 and 16, and is a relatively visco-elastic damping material when compared with the skin layers 14 and 16. The honeycomb core 18 made of fiberglass honeycomb and laminated as shown possesses sufficient stiffness so that the entire structure of the sonar dome 10 partakes of the same flexural motion. Stated differently, the thicknesses of the layers of the composite of the three layers making up the two skin layers 14 and 16 and the honeycomb core 18 should be small compared to the shortest wavelengths of any type of vibration within each of such three layers. Specifically, the wavelength of shear waves in the filled honeycomb core 18 must be large compared to the thickness of such honeycomb core 18, as these waves have the shortest wavelengths.

The relative variation in the visco-elasticity of the filled honeycomb core 18, namely, the relative "softness" of the filled honeycomb core 18 to the skin layers 14 and 16 in terms of acoustic transmission may be controlled by varying the nature of the substance utilized within the honeycomb core 18. Alternatively, the relative stiffness of the skin layers 14 and 16 may be varied. In this manner, the sonar dome 10 may be "tailor-made" in terms of self-damping characteristics, since the relative variation in the visco-elasticity of the filled honeycomb core 18 to the skin layers 14 and 16 may be closely regulated over a broad range.

As illustrative of one type of construction within the present invention there is submitted herewith the following example. However, it is to be understood that the nature of the materials used in the present invention may be greatly varied, and that such variation comes within the skill of an ordinary chemist having skill in this art. We assume, of course, that anyone making the constructions of the present invention is desirous of producing a useful construction.

A sonar dome having an overall thickness in the sonar window portion thereof of three eighths inch was formed from two laminated plastic skin layers, each having a thickness of three-thirty-seconds of an inch, and a fiberglass honeycomb having a thickness of three-sixteenths of an inch.

Each of the skin layers was formed from a laminated reinforced polyester resin, namely a mixture of a thermosetting resin formed from a dihydric alcohol and terephthalic acid, which mixture included a relatively rigid polyester resin of this type and a relatively flexible polyester resin of this type. Such resins are capable of being blended to allow intermediate degrees of flexibility. This enables the relative stiffness of the skin layers 14 and 16 to be selectively adjusted. In the subject example, the skin layers 14 and 16 were formed by a mixture of ninety parts of the relatively rigid polyester resin and ten parts of the relatively non-rigid polyester resin in the presence of a methyl ethyl ketone peroxide catalyst, with the mixture being thoroughly impregnated into the plies of a glass fabric. The resultant impregnated glass fabric was vacuum barrier molded at 160° F. using a polyvinyl alcohol barrier to produce a laminate. Upon cure of this laminate, the polyvinyl alcohol barrier was removed, and the upper ply of the laminate was similarly removed.

The aforesaid laminate was cut to produce a pair of layers, and a fiberglass honeycomb core was sandwiched intermediate such laminates juxtaposed to the ply adjacent the ply which has been removed. Such honeycomb core was of the type shown in the accompanying drawings, namely provided with openings 22 midway between its free ends. The honeycomb core was then bonded to the skin layer laminates by the application of an epoxy adhesive under heat and pressure. Naturally, other conventional techniques for the production of honeycomb sandwich laminates could have been used.

Mineral oil was selected as a typical damping agent and introduced into the honeycomb core, with care being taken to insure that a thorough penetration of the mineral oil throughout the honeycomb core was achieved, with all air spaces and voids being eliminated. After the mineral oil had penetrated throughout the honeycomb core, the openings 22 thereof were sealed.

The resultant structure possesses high physical strength characteristics. The presence of the viscous liquid within the honeycomb core renders the structure suitably continuous with respect to its acoustical impedance match with sea water, and therefore renders the material an excellent medium through which the compression forces of sonar signals will pass. However, when the shear waves of induced vibration attempt to traverse the structure, they encounter the viscous mass in the liquid-filled honeycomb core which reacts to slow their velocity. Thus, the amplitude of the standing wave is very rapidly attenuated, and highly effective damping is realized.

The present invention may be embodied in other specific forms without departing from the spirit or essential attributes thereof and, accordingly, reference should be made to the appended claims, rather than to the foregoing specification as indicating the scope of the invention.

We claim:

1. In a sonar dome, an acoustic window through which the compression waves of a sonar signal may be passed, said dome consisting of three layers, with each of the outer layers being substantially acoustically identical in section, and with the center layer being a relatively visco-elastic damping material compared with the outer layers and comprising a cellular core having interconnected cells, each of said cells containing a viscous material with the outer walls of the cells on the outer edge of said core being sealed, the stiffness of said core being sufficient so that the entire structure of the dome partakes of the same flexural vibration, and with the combined thickness of the three layers being non-detrimental to the transmission of critical frequencies through the dome.

2. In a sonar dome, an acoustic window through which the compression waves of a sonar signal may be passed, said dome consisting of three layers, with each of the outer layers being acoustically identical in section, and with the center layer being a relatively visco-elastic damping material compared with the outer layers and comprising a cellular core of honeycomb cells, the walls of each of said honeycomb cells being perforated to provide for liquid communication between said honeycomb cells, a liquid disposed within each of said cells, with the outer walls of the cells on the outer edge of said honeycomb core being sealed, the stiffness of said core being sufficient so that the entire structure of the dome partakes of the same flexural vibration, and with the combined thickness of the three layers being non-detrimental to the transmission of critical frequencies through the dome.

3. A sonar dome in accordance with claim 2 in which each of the outer layers is a laminated reinforced plastic.

4. A sonar dome in accordance with claim 2 in which the honeycomb core is fiberglass.

5. A sonar dome in accordance with claim 2 in which the solid portion of each of the three layers is metal.

References Cited in the file of this patent

UNITED STATES PATENTS

| 1,193,013 | Grant | Aug. 1, 1916 |
| 2,075,373 | Tomec | Mar. 30, 1937 |
| 2,184,139 | Cunnington | Dec. 19, 1939 |
| 2,434,666 | Mason | Jan. 20, 1948 |
| 2,444,911 | Benioff | July 13, 1948 |
| 2,609,068 | Pajak | Sept. 2, 1952 |
| 2,672,945 | Harris et al. | Mar. 23, 1954 |
| 2,744,042 | Pace | May 1, 1956 |

FOREIGN PATENTS

| 754,299 | Great Britain | Aug. 8, 1956 |